US009710763B2

(12) United States Patent
Linker et al.

(10) Patent No.: US 9,710,763 B2
(45) Date of Patent: Jul. 18, 2017

(54) METHOD AND SYSTEM FOR ROBOT UNDERSTANDING, KNOWLEDGE, CONVERSATION, VOLITION, PLANNING, AND ACTUATION

(71) Applicants: Sheldon O. Linker, Irvine, CA (US); Michael S. P. Miller, Beverly Hills, CA (US); Toni M. Poper, Irvine, CA (US)

(72) Inventors: Sheldon O. Linker, Irvine, CA (US); Michael S. P. Miller, Beverly Hills, CA (US); Toni M. Poper, Irvine, CA (US)

( * ) Notice: Subject to any disclaimer, the term of this patent is extended or adjusted under 35 U.S.C. 154(b) by 395 days.

(21) Appl. No.: 13/921,093

(22) Filed: Jun. 18, 2013

(65) Prior Publication Data

US 2014/0006320 A1    Jan. 2, 2014

Related U.S. Application Data

(60) Provisional application No. 61/665,214, filed on Jun. 27, 2012.

(51) Int. Cl.
| | |
|---|---|
| *G06N 99/00* | (2010.01) |
| *G06F 17/28* | (2006.01) |
| *G06N 5/02* | (2006.01) |
| *G10L 15/22* | (2006.01) |

(52) U.S. Cl.
CPC .......... *G06N 99/005* (2013.01); *G06F 17/28* (2013.01); *G06N 5/02* (2013.01); *G10L 15/22* (2013.01); *Y10S 901/03* (2013.01)

(58) Field of Classification Search
CPC ........ G06N 5/02; G06N 99/005; G10L 15/22; Y10S 901/03; G06F 17/28
See application file for complete search history.

(56) References Cited

U.S. PATENT DOCUMENTS

| | | | | |
|---|---|---|---|---|
| 5,809,493 | A * | 9/1998 | Ahamed | G06N 5/025 706/52 |
| 6,484,155 | B1 * | 11/2002 | Kiss | G06F 17/30864 706/45 |
| 8,027,945 | B1 * | 9/2011 | Elad et al. | 706/47 |
| 8,135,576 | B2 * | 3/2012 | Haley | G06F 17/2785 704/257 |

(Continued)

OTHER PUBLICATIONS

Eva Jacobus & Brian Duffy, The Language of Machines, 2003, Media Lab Europe, 1-6.*

(Continued)

*Primary Examiner* — Michael Zarroli
(74) *Attorney, Agent, or Firm* — Loza & Loza, LLP; Julio M. Loza; Jessica W. Smith

(57) ABSTRACT

A system for understanding and storing knowledge and plans in a speakable, formal class of languages, allowing querying and retrieving of that knowledge and plan (conversation), and of deciding and acting (volition) upon such plans is provided. The system further allows the users to input data, instructions, questions, queries, imperatives, and plans without structure or rules over and above the actual grammar of the class of languages. The system responds in words, phrases, complete sentences, or actions, as applicable, and its output is bound by the rules of logic, rather than correlation or likely meaning.

39 Claims, 22 Drawing Sheets

(56) References Cited

U.S. PATENT DOCUMENTS

| | | | | |
|---|---|---|---|---|
| 8,805,675 | B2* | 8/2014 | Kaiser | G06F 9/4448 |
| | | | | 704/1 |
| 9,201,920 | B2* | 12/2015 | Jain | G06F 17/2705 |
| 9,218,163 | B2* | 12/2015 | Dehors | G06F 8/41 |
| 2003/0009590 | A1* | 1/2003 | Linker | G06N 99/005 |
| | | | | 709/241 |
| 2007/0055656 | A1* | 3/2007 | Tunstall-Pedoe | G06F 17/30654 |
| 2012/0016678 | A1* | 1/2012 | Gruber et al. | 704/275 |
| 2013/0254139 | A1* | 9/2013 | Lei | 706/11 |
| 2014/0278343 | A1* | 9/2014 | Tran | 704/2 |

OTHER PUBLICATIONS

United States Court of Appeals for Fed Circuit, *Smartgene* v. *ABL*, Jan. 24, 2014.*

* cited by examiner

[0087] Shown as simple linear flow, for clarity, even though flow will optimally be implemented in a parallel manner

[0088] Pseudocode:

[0089] Input [401]
[0090] If the packet is invalid [402],
[0091] Respond [403]
[0092] Done
[0093] Parse [404]
[0094] If the grammar was invalid [405],
[0095] Respond [406]
[0096] Done
[0097] Run action-capable prover on input [407]
[0098] Send prover's response [408]
[0099] Run action-capable prover on all items in plan per FIG 5

FIG. 4A

[0100] Pseudocode:

[0101]     For each item in the plan [501]
[0102]         Run action-capable prover on that item [502]
[0103]         If logging is enabled [503]
[0104]             Send results to user`s queue [504]

FIG. 5A

[0105] Shown as simple linear flow, for clarity, even though flow will optimally be implemented in a parallel manner

[0106] Pseudocode:

[0107] Begin with an item from the user or the plan
[0108] If a user item [601]
[0109] Run a self-optimizer on the item [602]
[0110] If the item has become trivial (true, false, never actionable, etc) [603]
[0111] Note [604]
[0112] Done
[0113] Do a "fast prove" as shown in Fig 7, using data and plan storage [605]
[0114] If a Fast Prove result is not found [606],
[0115] Expand all rules (FOR ALL, THERE EXISTS, SUBSET, and the like) [607]
[0116] Do a "slow prove" as shown in FIG 8, using all storage [608]
[0117] If the result is a previously known logic state [609]
[0118] Act appropriately, as known to practitioners of the art [610]
[0119] Otherwise, if the result is an actionable imperative (neither TENSE nor NOT)
[0120] Move it to the execution queue [611]
[0121] Otherwise, if the result is a future imperative (TENSE) or complex imperative (LOGIC operators)
[0122] Move it to the plan [612]
[0123] Otherwise, the result is a negative imperative (NOT)
[0124] Remove it from the action queue [613]
[0125] Save as a negative plan [614]

FIG. 6A

[0126] Shown as simple linear flow, for clarity, even though flow will optimally be implemented in a parallel manner

[0127] Pseudocode:

[0128]   For each item in storage [701]
[0129]     If that item affects this item [702]
[0130]       Simplify this item (FIG 10) [703]
[0131]       If the item is now trivial [704]
[0132]         Stop
[0133]         Restart the process [705]

FIG. 7A

[0134] Shown as simple linear flow, for clarity, even though flow will optimally be implemented in a parallel manner

[0135] Pseudocode:

[0136] Until not restartable [801]
[0137] Mark the process as not restartable [802]
[0138] For each item in storage [803]
[0139] If the known item affects the putative item [804]
[0140] Simplify the putative item (FIG 10) [805]
[0141] If the Putative item is now trivial [806]
[0142] Remove the putative item [807]
[0143] Otherwise,
[0144] Mark the process as restartable [808]
[0145] Otherwise,
[0146] If the known item is not in permanent storage [809]
[0147] If the putative item affects the known item [810]
[0148] Simplify the known item (FIG 10) [811]
[0149] If the known item is now trivial [812]
[0150] Remove the known item [813]
[0151] Otherwise,
[0152] Mark the process as restartable [814]

FIG. 8A

[0153] Pseudocode:
[0154]   If the action is multipart AND action [901]
[0155]     Attempt to execute the first part [902]
[0156]     If successful [903]
[0157]       Attempt to execute the second part [904]
[0158]       If successful [905]
[0159]         Report success of both actions [906]
[0160]         Remove from the queue [907]
[0161]       Otherwise
[0162]         Attempt to undo the first action [908]
[0163]         If successful [909]
[0164]           Report that the action was attempted [910]
[0165]           If the action is not retryable [911]
[0166]             Remove from the queue [912]
[0167]         Otherwise
[0168]           Report the success of the first action, failure of the second and failure to undo [913]
[0169]           If the second action is retryable [914]
[0170]             Replace the combined AND action in the queue with the second part [915]
[0171]           Otherwise
[0172]             Remove the entire item from the queue [916]
[0173]     Otherwise
[0174]       Report the failed attempt [917]
[0175]       If the action is not retryable [918]
[0176]         Remove the AND action from the queue [919]

[0201] Pseudocode:

[0202] Perform the logical reduction action [1001]

[0203] If reporting of consideration is in effect [1002]

[0204] Report the reduction rule used using a tag [1003]. At the end of processing, only relevant tags will pass through a reporting filter.

FIG. 10A

METHOD AND SYSTEM FOR ROBOT UNDERSTANDING, KNOWLEDGE, CONVERSATION, VOLITION, PLANNING, AND ACTUATION

CLAIM OF PRIORITY UNDER 35 U.S.C. §119

The present utility application for patent claims priority to U.S. Provisional Application No. 61/665,214 Entitled "Method and System for Robot Understanding, Knowledge, Conversation, Volition, Planning, and Actuation" filed Jun. 27, 2012, is hereby expressly incorporated by reference herein.

FIELD

The present invention relates to the fields of Logic (specifically Theorem Provers), Artificial Intelligence (also known as AI or Machine Intelligence), to Knowledge Bases (which are related to Data Bases), to Robots (including all systems including actuators of any sort), to Planning Systems, and more specifically to knowledge bases integrated into a robot (or other actuator) control program, which in the case of the present invention, may deliver knowledge from a knowledge/plan base, learn new knowledge and techniques into the knowledge/plan base, act upon the knowledge/plan base, and remember its own actions and the results of those actions.

BACKGROUND

Robotic control systems generally act in a programmed sequence of moves, either without input or in a simple input-triggers-response format. Robots do not, however, make their own plans. Therefore, there is a need for a robot to be able to act as a conversational, free-form, intelligent repository of knowledge and plans, able to accept general statements, questions, and instructions, and to respond in kind or in action, without regard to any sort of script or limitation on subject or complexity, alone or in consort with other robots.

SUMMARY OF THE PRESENT INVENTION

Introduction

The current invention introduces new concepts to logical states and theorem proving, those of imperatives, implied imperatives, negative imperatives, moot imperatives, and plans. Previous systems, such as JCB-English™ (U.S. Pat. No. 8,177,022) could decide to store data or not, and could answer questions given data. The current invention can decide to take action, or not to take action, as well as explain its reasoning. The facilities taught here are (a) a robot deciding, on its own, to take some action, because it thought that such action was appropriate and timely, (b) a robot deciding, on its own, that an action, even if directed, is best not done, (c) the ability for a robot to tell its master why it's doing what it's doing, and (d) the ability for a robot to tell its master why it's not doing something it has been asked to do. Here, we are still in the realm of reasoning, but, we are expanding the types of reasoning from thought to action.

Specifically

A method is provided for processing a language and sensory input, comprising: (a) inputting data in a language, from users, sensory apparatus, and/or other equipment, and memory of actions taken; (b) parsing the input data into an internal format if not already presented in an internal format; (c) comparing the parsed input data and plans with stored data and plans in a data/knowledge/plan base to prove, disprove or determine if the parsed data is plausible and/or actionable; (d) storing results of the evaluation in the data/knowledge/plan base and execution queue, (e) acting upon the execution queue, and/or (f) preventing forbidden actions from occurring. The user-generated and sensor-generated input data may be in any unambiguous format, preferably as described in U.S. Pat. No. 8,177,022, expanded to include imperatives and/or statements which imply requirements and/or imperatives.

The method may also include (a) determining whether the input data is a command, requirement, or another form of speech, (b) discarding the input data if the input data is already known or provably false. The language may include a grammar structure defined by a characteristic ability to support direct and conditional imperatives.

The method may further include (a) retaining the input data if the input data is a statement or plan which provides new information or planning to the data/knowledge/plan base and adding the statement or plan to the data/knowledge/plan base, (b) retrieving selected plans stored in the data/knowledge/plan base in response to a question, (c) formatting the selected data into a language for output, and/or (d) acting upon a plan or plans, when appropriate, using the robot body (including other actuator-based systems, using real and/or simulated robots, robot parts, and/or actuators) most appropriate, or several robot bodies or actuators when appropriate.

The method may further include (a) cancellation of an action by canceling a cause of that action, (b) cancellation of an action by canceling a result of that action, (c) cancellation or pre-emption of an action by prohibiting it, and/or (d) explanation of the cause(s) of an action. This facility is provided by associating plans (future actions, including future possible actions and restrictions on future possible actions) and actions (both as described herein) with a list of statements, rules, inputs, facts, and other storable items used to determine that the item is executable or not, or to advance the plan item towards execution.

Any theorem prover can be expanded to include such planning and robot volition by adding a flag or state in that theorem prover to distinguish a fact from an imperative. A fact is similar to an imperative, but slightly different, in that a fact is true (or plausible or false) in its own right. An imperative is something which is intended to become true through some action under control of the greater system in which the prover/planner is embedded or on its own. In addition to the methods and/or devices described in U.S. Pat. No. 8,177,022, the prover device is expanded as explained below to include processing of imperatives and plans, storing them if potentially actionable or prohibited, and additional modules are added, comprising (a) input sensors which input to memory, directly or via the language described, causing a re-evaluation of the knowledge/plan base at each sensory input frame (where a frame is the smallest complete sensory input time—for instance, a single frame of video or a pair of sampled input voltages from a stereo microphone set) or on another schedule, (b) an execution queue of imperatives ready for execution, and (c) an executive module which acts upon items enqueued for execution and which adds memory of such items having been executed, either directly or through the language described.

As an example of the above, "You are cooking dinner" is a fact (or not). "You shall cook dinner" is an imperative, and is equivalent to "It is imperative that at some point 'You are cooking dinner' is accomplished completely", whether this is stored as a flag on a fact, a wrapper of some sort on the fact, or by some other means. Experiments on the JCB implementation have shown that an attached flag is optimal for speed and size.

Logical States

A simple imperative is an imperative that can be initiated or sent to an execution queue immediately. For instance, "Tie your shoes" is a simple imperative. A plan is an imperative that relies on some other fact which is not yet known or not yet true. An example of reliance on something not yet known is "If there are aliens in Andromeda, feed the cat". An example of something not yet true is "Tomorrow, feed the cat". A moot imperative is a plan based on something false. An example of a moot imperative is "If 0=1, feed the cat". In a theorem prover modified as stated above, this becomes "If False, feed the cat", which becomes "False", which drops out of consideration (and thus memory) entirely. A negative imperative is an imperative that never comes into executable state, and when compared by a prover (as modified above), will prevent similar plans from ever being executed. For instance, "Don't hurt a human" is a negative imperative, and would cancel out "Kill Fred" in a logical proof involving imperatives in a prover so modified.

The foregoing, together with other features and advantages of the present invention, will become more apparent when referring to the following specification, claims and accompanying drawings.

BRIEF DESCRIPTION OF THE DRAWINGS

Various features of the present invention will be better understood from the following detailed description of an exemplary embodiment of the invention, taken in conjunction with the accompanying drawing in which like reference numerals refer to like parts.

FIG. 4A is a pseudocode of an input process and FIG. 4B is a flow chart of the input process.

FIG. 5A is a pseudocode of time-based consideration and FIG. 5B is a flow chart of time-based consideration.

FIG. 6A is a pseudocode of operation of an action-capable prover and FIG. 6B is a flow chart of the operation of an action-capable prover.

FIG. 7A is pseudocode of operation of an action-capable "fast prover" component and FIG. 7B is a flow chart of the operation of an action-capable "fast prover" component.

FIG. 9A and 9B are pseudocode of execution of an item in an execution queue and FIG. 9C, 9D, 9E, 9F, and 9G are a flow chart of execution of an item in the execution queue.

FIG. 10A is a pseudocode of a prover reduction modified to explain actions or lack thereof and FIG. 10B is a flow chart of a prover reduction modified to explain actions or the lack thereof.

DETAILED DESCRIPTION OF THE INVENTION

Figure 1:
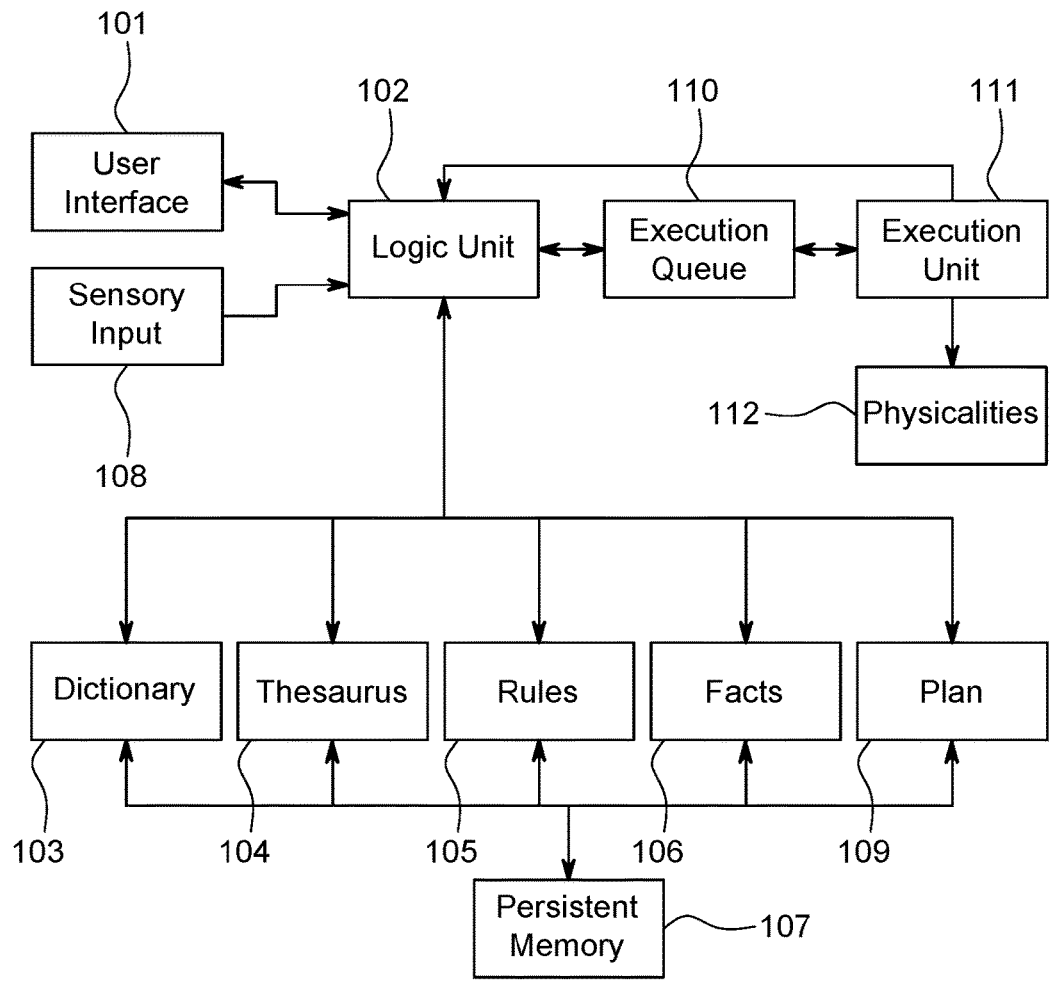
FIG. 1 is a block diagram illustrating one example of the functional architecture of the computing system according to one embodiment of the invention.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that the embodiments may be described as a process that is depicted as a combined flow/structure/block diagram. The order of the operations is unimportant, and can happen in any order or optimally at the same time. The order of connections may be rearranged. A process may terminate when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" and "computer readable medium" include, but are not limited to, portable or fixed storage devices, optical storage devices, and/or various other mediums capable of storing, containing or carrying instruction(s) and/or data. If and when quantum storage becomes available, the logic states of True, False, and Plausible may be stored in a single qubit (quantum bit).

Furthermore, embodiments may be implemented by means including but not limited to hardware, software, firmware, middleware, microcode, or any combination thereof. When implemented in methods including but not limited to software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration. Here, "processor" includes sequential processors, signal processors, neural networks, quantum-based processors, and all combinations thereof, and all successors thereto.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, DVD, or any other form of storage medium known in the art. A storage medium may be coupled to the processor such that the processor can read information from, and write information to, the storage medium. In the alternative, the storage medium may be integral to the processor.

General Overview

One aspect of the present invention may overcome the problems discussed above by disclosing how a formal language (for example, JCB-English as described in U.S. Pat. No. 8,177,022) may be enhanced to include imperatives, requirements and plans, which retains all the properties of the base language.

Another aspect of the present invention discloses how a program, computer, device, network, or similar artifice may not only understand and/or converse in such a language, but in addition plan actions, and act upon instructions, imperatives, and plans expressed in such a language, including but not limited to acting as (i) a knowledge/plan base system requiring no programming, (ii) a database and planning system requiring neither schemata nor programming, (iii) a theorem prover requiring no programming, and/or (iv) to other uses envisaged by various fiction and nonfiction authors. Note that although a specific formal language is used for purposes of example and illustration, the techniques disclosed herein may be implemented with a large class of languages, covering a vast plurality of styles, base natural languages, and base formal languages. Such languages are unambiguous.

Such formal languages may be used to allow software applications, computers, machines, and/or a combination thereof, to mimic the operation of natural language. The lack of ambiguity in the class of formal languages described above means that a method or system processing and/or understanding such formal language need not score its results or attempt to assign a best or most likely meaning, as there is always exactly one meaning to any sentence or other grammatical element. By way of example, the following is a sample conversation between a user and a computer controlling a collection of robots and/or actuators:

User: Please feed "Fido".
Computer: This plan is being saved.
User: Tomorrow, either "Hewey" or "Dewey" must vacuum.
Computer: This plan is being saved. At 1:03:14 pm today, "Louis" fed "Fido".

In the present invention, a user may use a logical language, such as JCB-English, Loglan, Lojban, or any other unambiguous language containing imperatives, either currently in existence, or which might come into existence at some future point, with a fully known grammar, or any "functional derivation" of such a language may be used to achieve unambiguous parsing and unambiguous word meaning, which in turn may be used to achieve understanding of what was entered, sensed, or transmitted, both on the part of human listeners or readers, and machine understanding of what was said, sensed, or sent, which in turn may be used to achieve automatic data, knowledge, and/or storage and retrieval, and human-machine conversation without the need for additional programming. An implementer may also use a subset of a natural language, when such subset meets the requirement of nonambiguity.

Such a system can serve a variety of users, at a variety of privilege levels and veracity levels, using a variety of robot bodies or other devices. The system may evaluate the utterance, and for each statement, imperative, or plan, decide whether the information presented is worth storing, and if so, how. Imperatives may be executed or taken under advisement. Responses from the system to the user can be in functional forms, constructed languages, or any natural language, given a formatting function for the target language.

At least one implementation of the system may range from dedicated, embedded system, to wide-area-networked distributed and shared data. Some instantiations may include a veneer, shell or "skin" language and/or graphical user interface, to map one language into another, and/or to provide the user(s) a more pleasant use experience.

The present invention provides a method and system for machine understanding of text (a textual representation of a language, whether that language was delivered as text, speech, sign language, or by any other means), retention of knowledge, plans, and conversation. The system can be implemented in software and executed by a computing system (which may itself be a collection of systems). To facilitate an understanding of the preferred embodiment, the general architecture and operation of a computing system is described along with examples of specific processes. In contrast to existing and prior art systems that use pattern matching and probabilities, one aspect of the present invention uses an unambiguous, formal grammar in which all rules are well-defined, and thus stores and compares concepts, without the need for pattern matching or probabilities.

Epistemology and Proofs

Statements are evaluated against one another using an expansion of Boolean logic (as described in U.S. Pat. No. 8,177,022). However, in the present invention, the various logical operations may also act on and result in, in addition to the standard logic and '022 logic, the additional logical state "Imperative" (with various sub-states such as "Simple", "Plan", "Negative", and "Moot"), meaning that the predication is an imperative command or restriction against an imperative command, which can be executed or thwarted under certain conditions and/or at certain times and places. If, given a knowledge/plan base and a new imperative or plan, one embodiment handles statements, in the single-user case, as follows: (a) If the knowledge/plan base shows that the new imperative or plan is immediately executable, then the new imperative is moved immediately to the execution queue ("Simple"); (b) If the knowledge/plan base shows that the new imperative or plan is already planned or awaiting execution, then the new imperative is discarded as superfluous ("Moot"); (c) If the knowledge/plan base shows that the new imperative can never be executed, then the new imperative is rejected ("Negative"). In the present invention, an error message or a counterclaim, stating the actual fact, imperative, plan, or series of facts which leads to the rejection will be issued; (d) If the knowledge base shows that the new imperative or plan can plausibly be executed in the future, then the new imperative or plan may be stored in the plan base ("Plan"); and (e) At any time, the system may search for items which are now superfluous, and delete them without effect on knowledge or planning. In this manner, "plan" and "desire" are interchangeable.

If there are multiple robot bodies or other actuators or output devices, and the imperative or plan does not call for a specific such device to be used, any appropriate device may be used. In the preferred implementation, the device first available, and/or best able to complete the task quickly, would be used. As in many existing systems, a user may be required to have adequate permissions to cause a given action on a given device.

Tables 1 through 6 illustrate expansion of "And", "Or", "If", "If and only if", "Exclusively", and "Not" logic, respectively, to include "Imperative" results in addition to the logic already known for extended Boolean logic.

TABLE 1

If, showing prior art in italics

| IF | True | False | Plausible | Question | Imperative (Simple) | *Imperative (Plan)* | Complicated |
|---|---|---|---|---|---|---|---|
| *True* | *True* | *False* | *Plausible* | *Question* | Imperative (Simple) | *Imperative (Plan)* | *Complicated* |
| *False* | *True* | *True* | *Plausible* | *Complicated* | Imperative (Moot) | *Imperative (Moot)* | *Complicated* |
| *Plausible* | *Plausible* | *Plausible* | *Plausible* | *Complicated* | Imperative (Plan) | *Imperative (Plan)* | *Complicated* |
| *Question* | *Complicated* | *Complicated* | *Complicated* | *Complicated* | Complicated | *Complicated* | *Complicated* |
| Imperative (Simple) | Complicated | Complicated | Complicated | Complicated | Imperative (Plan) | Imperative (Plan) | Complicated |
| Imperative (Plan) | Complicated | Complicated | Complicated | Complicated | Imperative (Plan) | Imperative (Plan) | Complicated |
| *Complicated* | *Complicated* | *Complicated* | *Complicated* | *Complicated* | Complicated | Complicated | *Complicated* |

TABLE 2

And, showing prior art in italics

| AND | True | False | Plausible | Question | Imperative (Simple) | Imperative (Plan) | Complicated |
|---|---|---|---|---|---|---|---|
| *True* | *True* | *False* | *Plausible* | *Question* | Imperative (Simple) | Imperative (Plan) | *Complicated* |
| *False* | *False* | *False* | *False* | *False* | False | False | *False* |
| *Plausible* | *Plausible* | *False* | *Plausible* | *Complicated* | Imperative (Plan) | Imperative (Plan) | *Complicated* |
| *Question* | *Question* | *False* | *Complicated* | *Complicated* | Complicated | Complicated | *Complicated* |
| Imperative (Simple) | Imperative (Simple) | False | Imperative (Plan) | Complicated | Imperative (Simple) | Imperative (Plan) | Complicated |
| Imperative (Plan) | Imperative (Plan) | False | Imperative (Plan) | Complicated | Imperative (Plan) | Imperative (Plan) | Complicated |
| *Complicated* | *Complicated* | *False* | *Complicated* | *Complicated* | Complicated | Complicated | *Complicated* |

TABLE 3

Or, showing prior art in italics

| OR | True | False | Plausible | Question | Imperative (Simple) | Imperative (Plan) | Complicated |
|---|---|---|---|---|---|---|---|
| *True* | *True* | *True* | *True* | *True* | True | True | *True* |
| *False* | *True* | *False* | *Plausible* | *Question* | Imperative (Simple) | Imperative (Plan) | *Complicated* |
| *Plausible* | *True* | *Plausible* | *Plausible* | *Complicated* | Imperative (Plan) | Imperative (Plan) | *Complicated* |
| *Question* | *True* | *Question* | *Complicated* | *Complicated* | Complicated | Complicated | *Complicated* |
| Imperative (Simple) | True | Imperative (Simple) | Imperative (Plan) | Complicated | Imperative (Simple) | Imperative (Plan) | Complicated |
| Imperative (Plan) | True | Imperative (Plan) | Imperative (Plan) | Complicated | Imperative (Plan) | Imperative (Plan) | Complicated |
| *Complicated* | *True* | *Complicated* | *Complicated* | *Complicated* | Complicated | Complicated | *Complicated* |

TABLE 4

If and only if, showing prior art in italics

| IFF | True | False | Plausible | Question | Imperative (Simple) | Imperative (Plan) | Complicated |
|---|---|---|---|---|---|---|---|
| True | True | False | Plausible | Question | Imperative (Simple) | Imperative (Plan) | Complicated |
| False | False | True | Plausible | Complicated | Imperative (Moot) | Imperative (Moot) | Complicated |
| Plausible | Plausible | Plausible | Plausible | Complicated | Imperative (Plan) | Imperative (Plan) | Complicated |
| Question | Question | Complicated | Complicated | Complicated | Complicated | Complicated | Complicated |
| Imperative (Simple) | Imperative (Simple) | Imperative (Moot) | Imperative (Plan) | Complicated | Imperative (Simple) | Imperative (Plan) | Complicated |
| Imperative (Plan) | Imperative (Plan) | Imperative (Moot) | Imperative (Plan) | Complicated | Imperative (Plan) | Imperative (Plan) | Complicated |
| Complicated | Complicated | Complicated | Complicated | Complicated | Complicated | Complicated | Complicated |

TABLE 5

Not, showing prior art in italics

| True | False | Plausible | Question | Imperative (Simple) | Imperative (Plan) | Complicated |
|---|---|---|---|---|---|---|
| False | True | Plausible | Question | Imperative (Negative) | Imperative (Negative) | Complicated |

TABLE 6

Exclusively, showing prior art in italics

| XOR | True | False | Plausible | Question | Imperative (Simple) | Imperative (Plan) | Complicated |
|---|---|---|---|---|---|---|---|
| True | False | True | Plausible | Complicated | Imperative (Negative) | Imperative (Negative) | Complicated |
| False | True | True | Plausible | Complicated | Imperative (Simple) | Imperative (Plan) | Complicated |
| Plausible | Plausible | Plausible | Plausible | Complicated | Imperative (Plan) | Imperative (Plan) | Complicated |
| Question | Complicated | Complicated | Complicated | Complicated | Complicated | Complicated | Complicated |
| Imperative (Simple) | Imperative (Negative) | Imperative (Simple) | Imperative (Plan) | Complicated | Imperative (Simple) | Imperative (Plan) | Complicated |
| Imperative (Plan) | Imperative (Negative) | Imperative (Plan) | Imperative (Plan) | Complicated | Imperative (Plan) | Imperative (Plan) | Complicated |
| Complicated | Complicated | Complicated | Complicated | Complicated | Complicated | Complicated | Complicated |

In each of the two-dimensional tables, the first argument appears on the left, and the second argument appears on the top. For instance, "If plausible-item then imperative-item" results in an imperative plan. If the plausible item comes to be known as true, then the plan becomes a simple imperative. As another example, "Exclusively imperative-item or imperative-item", the compound imperative moves directly to the execution queue, and the executive module must attempt the easier or quicker imperative, and not do the other imperative. If the first-tried imperative failed, it would attempt the other imperative.

A negative imperative can be used in several ways. In the preferred implementation, a negative imperative can be used to cancel an action already enqueued for execution. For instance, "Please paint" could be canceled by "Do not paint". (In this example, "Do not" could expand to "Please not", or could be otherwise expressed in the formal grammar.) A standing negative imperative may be used as a user rule. For instance, a user could instruct that a robot not enter his room, and orders to the contrary would cancel out, with a report back to the user. The user could later tell the system to forget a standing negative order, so that such orders themselves can be canceled. Standing negative imperatives at the system level, or owned by the "operator" or other privileged user can be used to create inviolable rules, such as Isaac Asimov's "Three-Laws Safe" (previously just science fiction).

Syntactic Elements

Utterances in the present invention (in addition to the utterances described in U.S. Pat. No. 8,177,022) allow predications (sentences) which are themselves imperative. These imperatives can be combined into complex imperatives, plans, and instructions. The simplest examples of such expanded grammar are the predications "Please sentence" and "subject must verb objects". An imperative is executable when there are no remaining preconditions. Of course, other words can be used for these purposes. When languages other than English are the basis language, other appropriate words and grammars are to be used, for instance, "하" or "ㅂ씨다".

Computing System (High-Level Description)

FIG. 1 is a block-and-functional diagram of a computing system for executing computer executable process elements or steps according to one embodiment of the disclosure. FIG. 1 includes a User interface [101], Logic unit (which serves as an interconnect between many of the other components) [102], Dictionary storage area [103], Thesaurus storage area [104], Rule storage area [105], Fact storage area [106], and Persistent memory [107], each of which is a part of prior art (as explained in U.S. Pat. No. 8,177,022), and shown in italics. In addition, the Sensory input units [108]

can enter facts observed into the logic unit at any time, using internal storage format, or in the class of languages described. Sensory input [108] may also report directly to the user input [101], although that is not required for the present invention to function, and so is not included in the figure. The Plan storage [109] stores imperatives not yet ready to execute, including negative imperatives, which form prohibitions against execution. In the preferred embodiment, new facts will modify these plans toward being executable imperatives. The Execution queue [110] can be separate or combined memory containing imperatives (simple and/or compound) ready for execution. The Execution unit [111] determines the order in which the execution queue is to be executed. The manner of such decision is not a part of this invention, and can be anything from first-in, first-executed to something far more clever. The "Physicality" [112] is the device or devices, or simulations of such, which physically carry out the instructions, including as but not limited to robot(s) and/or actuator(s) and/or simulations thereof. When an instruction has been executed, the Execution unit may add memory of such execution, or attempted execution, back into the memory, directly or through the language described. The execution queue [110] may report reasoning used by the logic unit [102] back to that unit, to be reported through the user interface [101] back to the user. This may be used for users' "why" questions.

Figure 2:
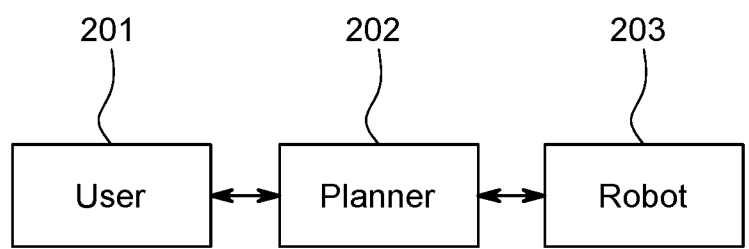
FIG. 2 is a block diagram illustrating one example of the system in which a single user is directing a single robot.

FIG. 2 is a block-and-functional diagram of a complete system in which a single user [201] interacts with a knowledge-base-and-planning system ("Planner") [202], which drives a single actuator or robot (or simulation thereof) [203].

Figure 3:
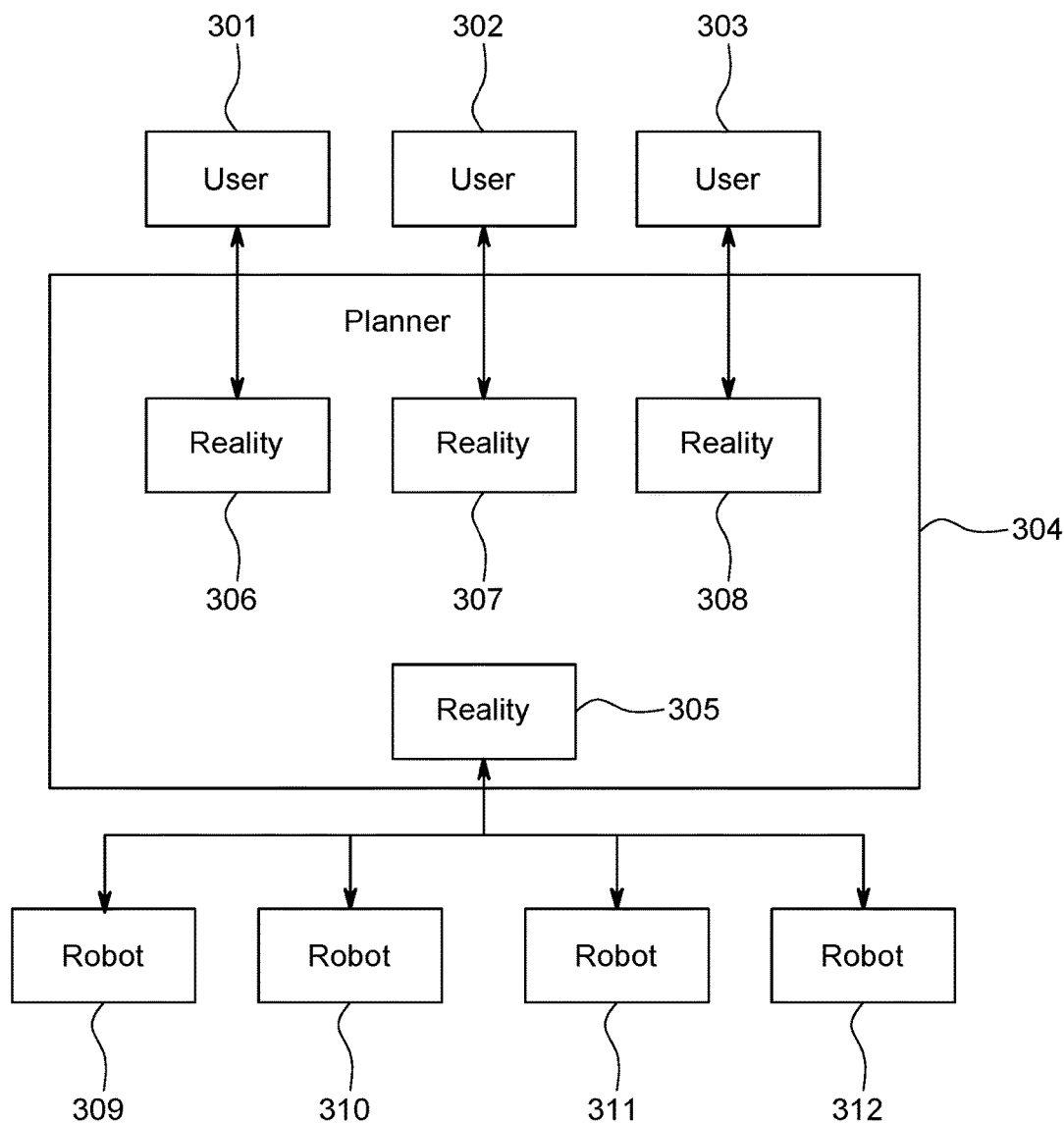
FIG. 3 is a block diagram illustrating one example of the system in which multiple users are directing multiple robots.

FIG. 3 is a block-and-functional diagram of a complete system in which a number of users [301 through 303] interact with a knowledge-base-and-planning system [304], containing shared [305] and distinct [306 through 308] data and plans (realities), driving multiple actuator or robots (or simulations thereof) [309 through 312]. Although pluralities of certain items are depicted in groups of three, this is for example purposes only. Any number of such items may be used.

Figure 4B:
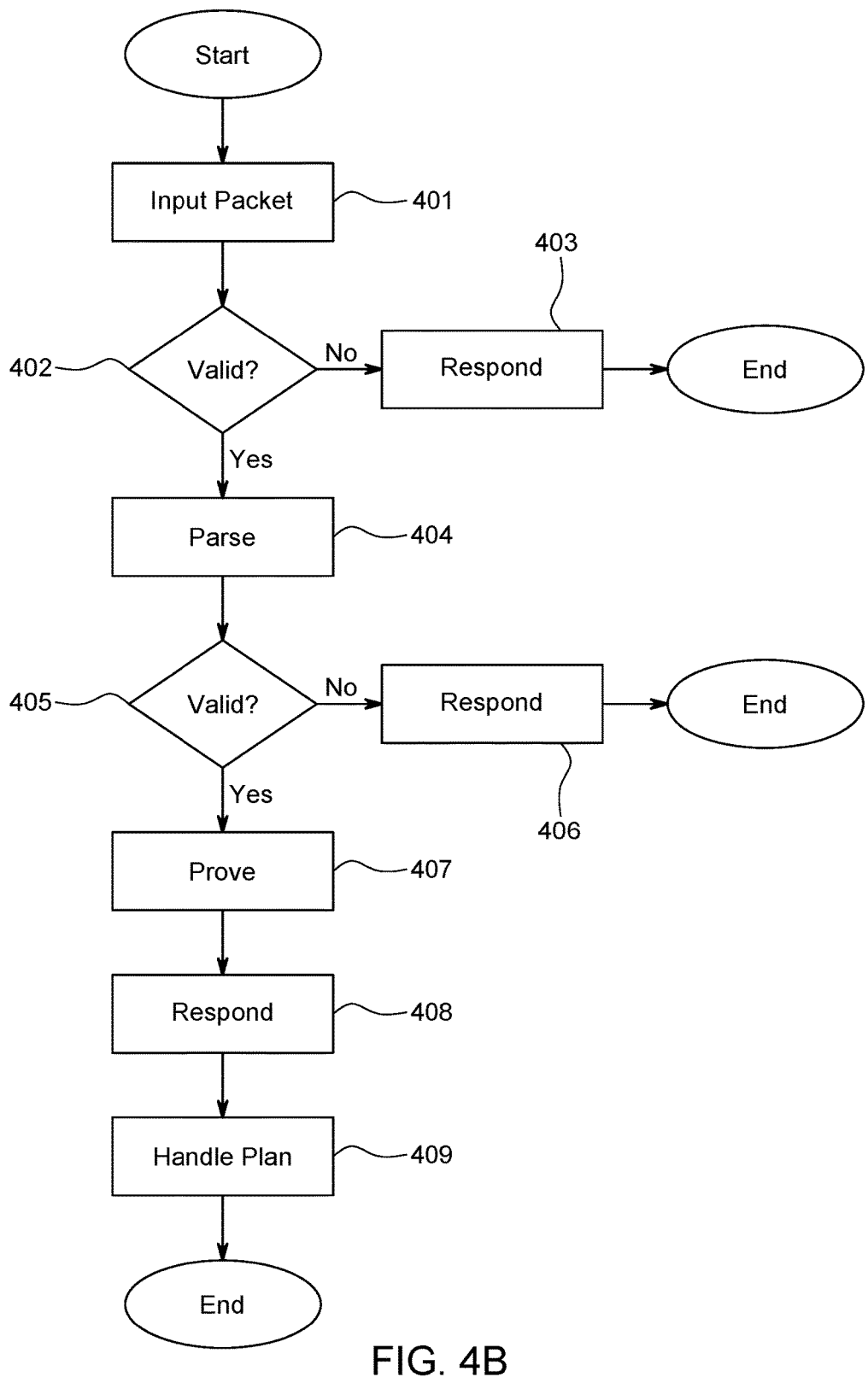

FIG. 4 is a flow chart and pseudocode of the input process. In the process depicted, input is received [401]. This may be in the form of an Internet Protocol packet or by any other means. The packet is then checked for validity [402]. Invalidity can include but is not limited to transmission and security concerns. If the input is invalid, a response explaining the problem is made to the sender [403]. The input is then parsed [404]. If the grammar was invalid, or if there was a similar error [405], a response is made explaining the problem [406]. The action-capable prover is then run with the supplied input (see FIG. 5) [407]. The prover's response is sent to the sender [408]. The action-capable prover is also run on all items then in the plan storage [409]. The loop repeats as needed (in this text, when no other action is specified).

Figure 5B:
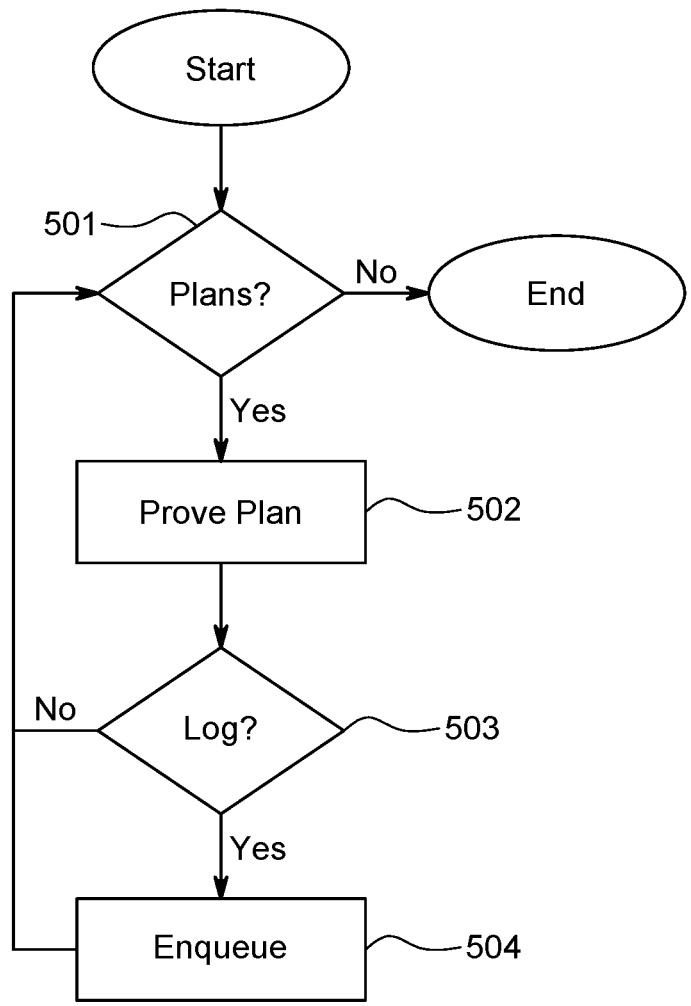

FIG. 5 is a flow chart and pseudocode of time-based consideration. In the process depicted, at regular intervals or when scheduled based on dates and times in the Plan storage, all elements in the Plan storage are evaluated [501]. This evaluation occurs by using an action-capable prover on the given plan item to determine if it is currently executable [502]. If such a prover determines that the item is executable, then as a by-product, the plan item moves to the execution queue. If logging produced a set of reasoning as to why the Plan item is executable or not [503], then that reasoning is copied to a user-specific or user-keyed queue [504] for output the next time the system is in communication with the user.

Figure 6B:
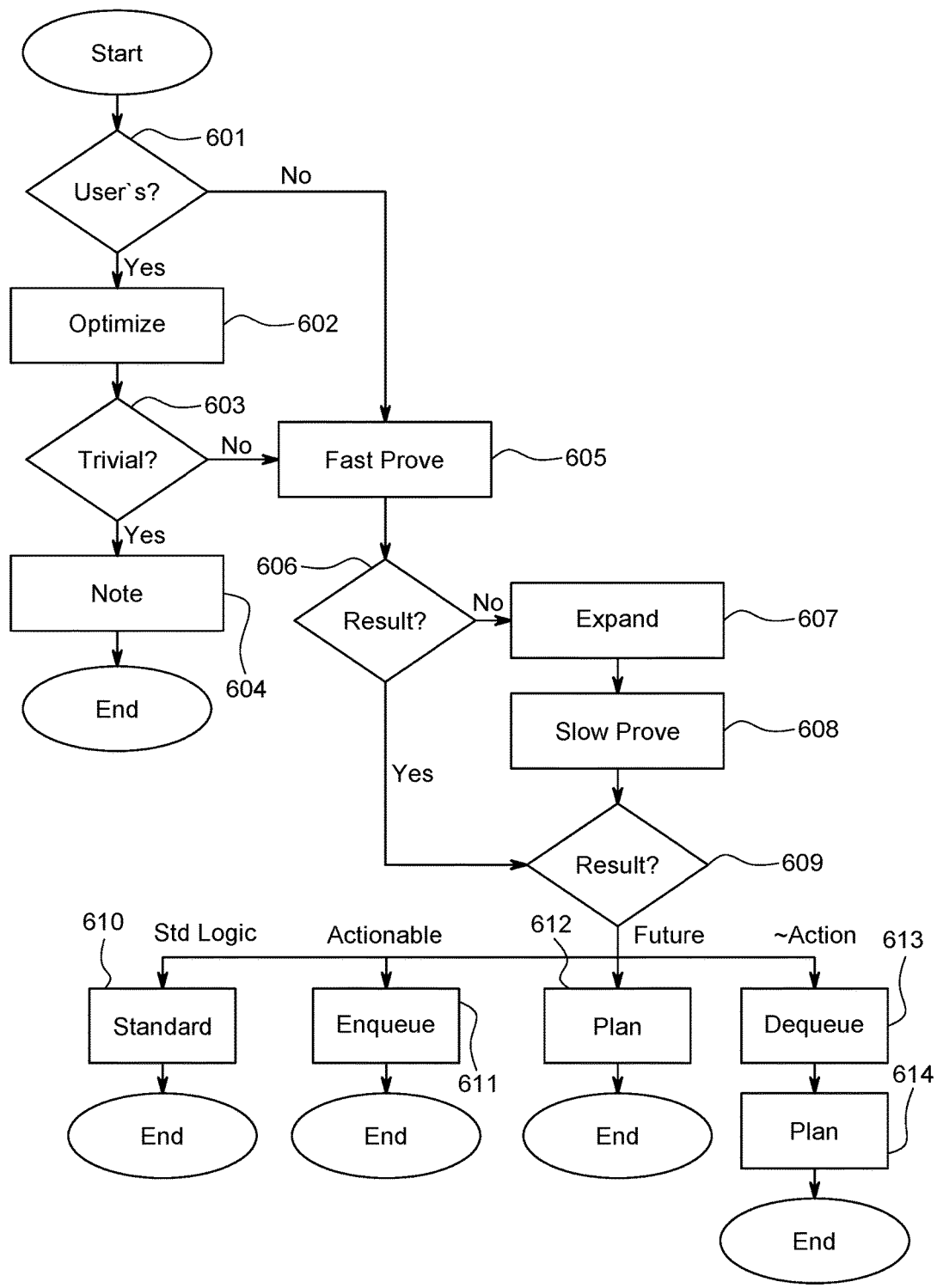
Figure 7B:
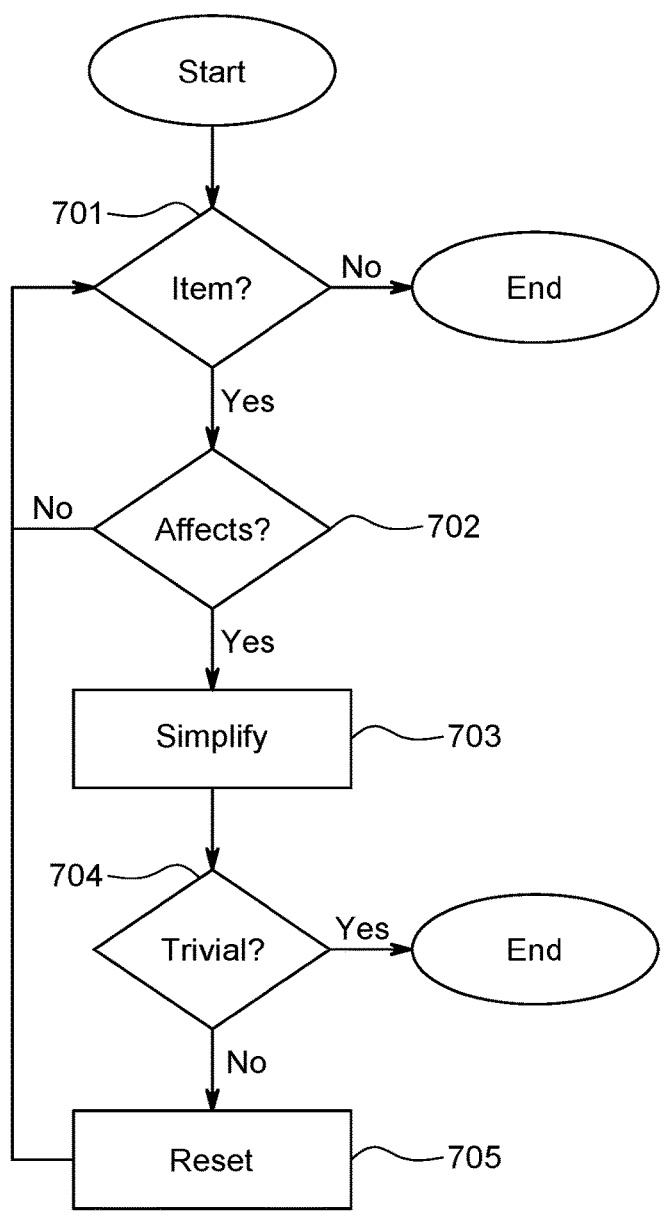

FIG. 6 is a flow chart and pseudocode of the operation of an action-capable prover. In the process depicted, if an item sent for proof is a user item, rather than an item already in the knowledge/plan base [601], then the item is optimized (for instance, $\neg\neg X$ becomes X) [602]. If, as a result of the optimization, the item becomes trivial (such as True, False, or the like) [603], then output is sent to the user [604], and the processing is complete. Failing that, a "fast proof" is run on the item (as shown in FIG. 7), using the knowledge/plan base [605]. If the fast prover does not find a solution [606], then more detailed work is needed. All items involving Boolean calculus ($\forall, \exists, \subset$, and the like), are expanded into temporary storage [607]. The "slow prover" (FIG. 8) is then run on both the knowledge/plan base and temporary storage [608]. Whether or not the slow prover came into use, the latest prover result is examined. If a logical state known to practitioners of that art prior to this invention is found (True, False, Plausible, Question, Query, or the like) [609], then the existing standard action is taken [610]. If the logical state shows and Actionable Imperative, then the item is moved to the execution queue [611]. If it has a tense or other logical component yet to be determined, then it is moved into the knowledge/plan base for later determination [612]. If the item is a Negative Imperative, then it is both removed from the execution queue (if present there) [613] and saved into the plan base as a negative imperative [614].

FIG. 7 is a flow chart and pseudocode of the operation of an action-capable "fast prover" component. In the process depicted, each element of the knowledge/plan base is checked against the item which the invention is attempting to prove [701]. If that known item affects the current item (causes a reduction) [702], then the item is simplified (reduced) [703]. If the item becomes trivial (as explained above) [704], the proof stops. If the item is affected but not in such a way as to become trivial, then the proof starts over [705].

Figure 8B:
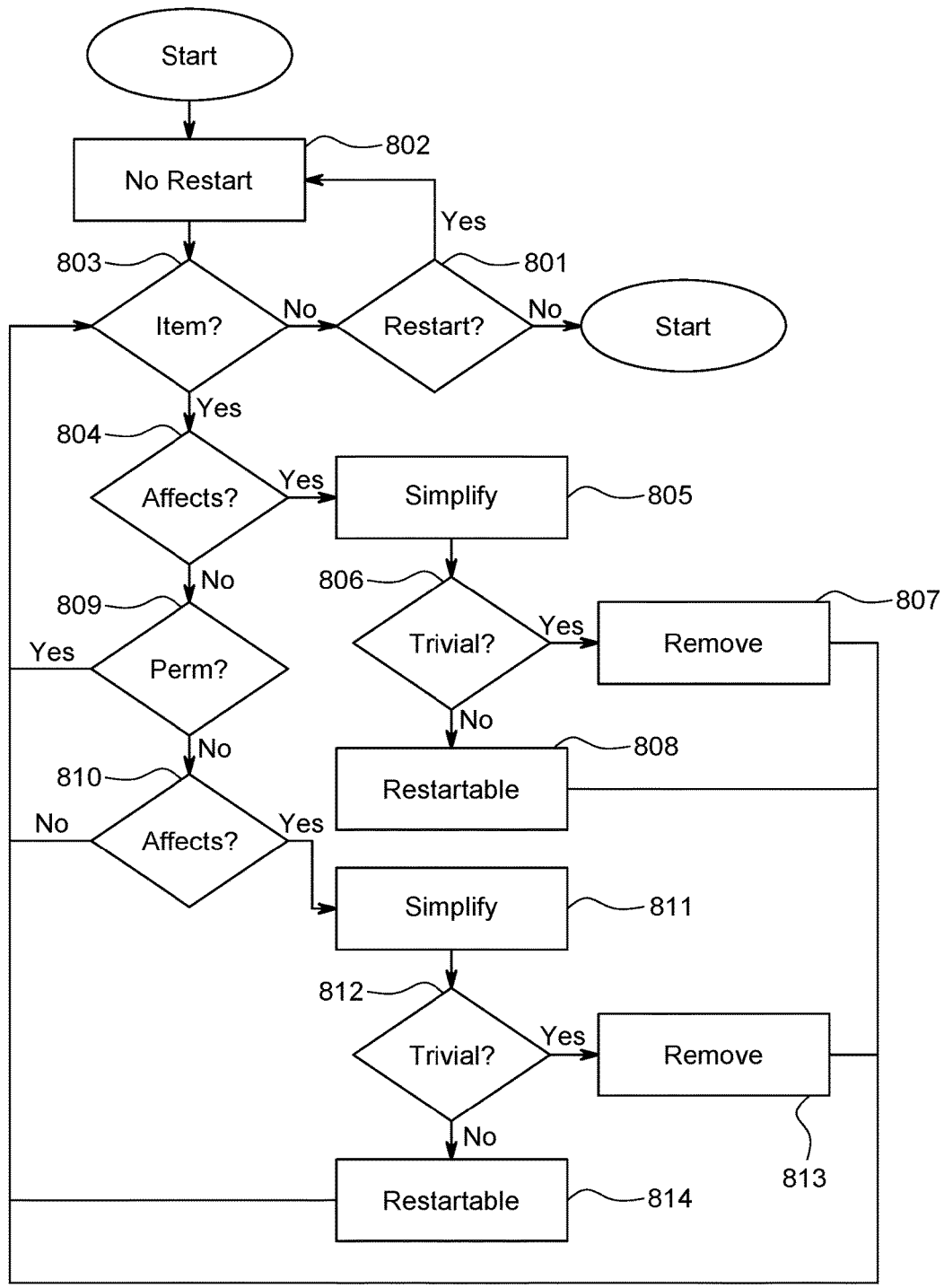
FIG. 8A is pseudocode of operation of an action-capable "slow prover" component of FIG. 8B is a flow chart of the operation of an action-capable "slow prover" component.
Figure 9B:
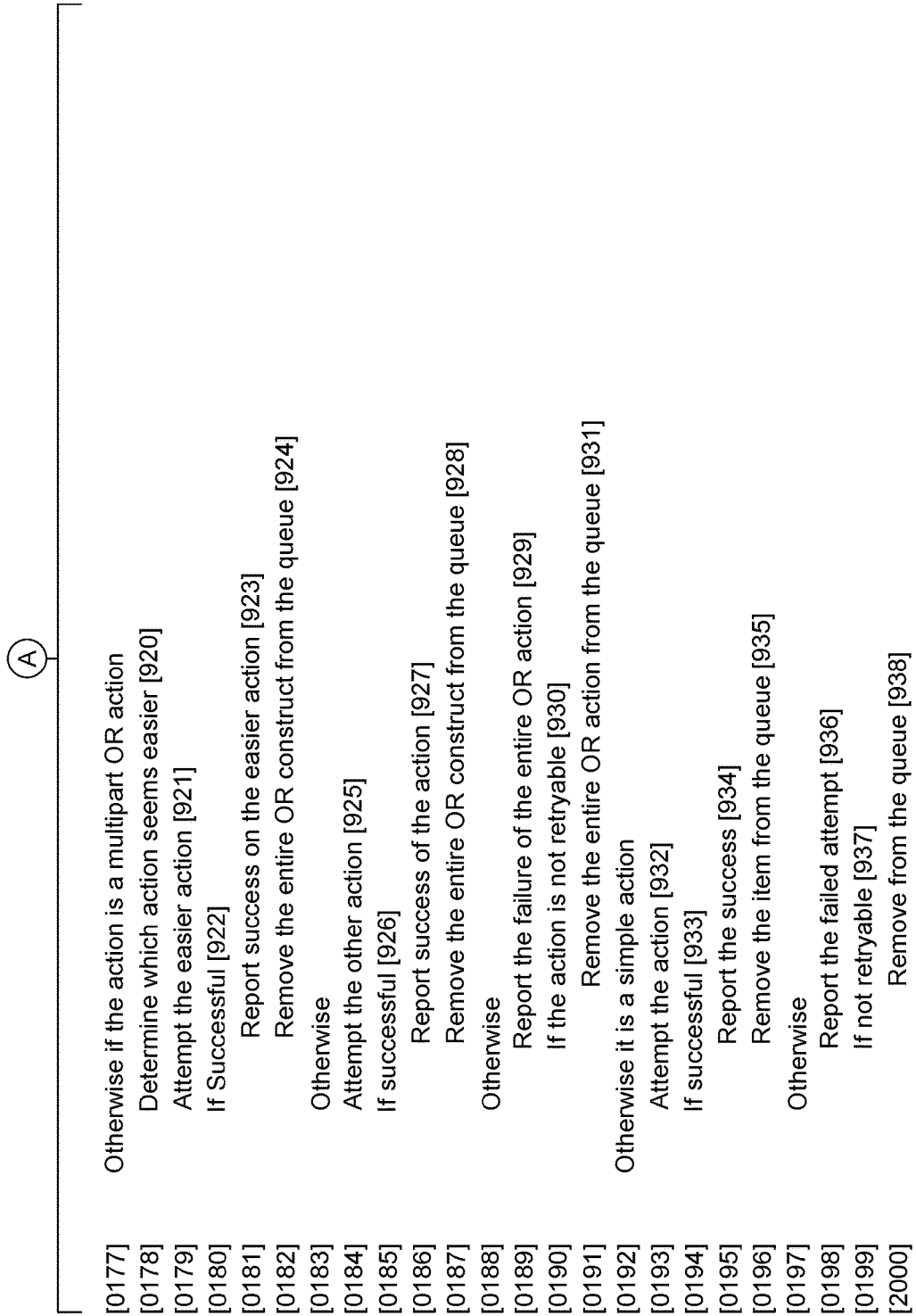
Figure 9C:
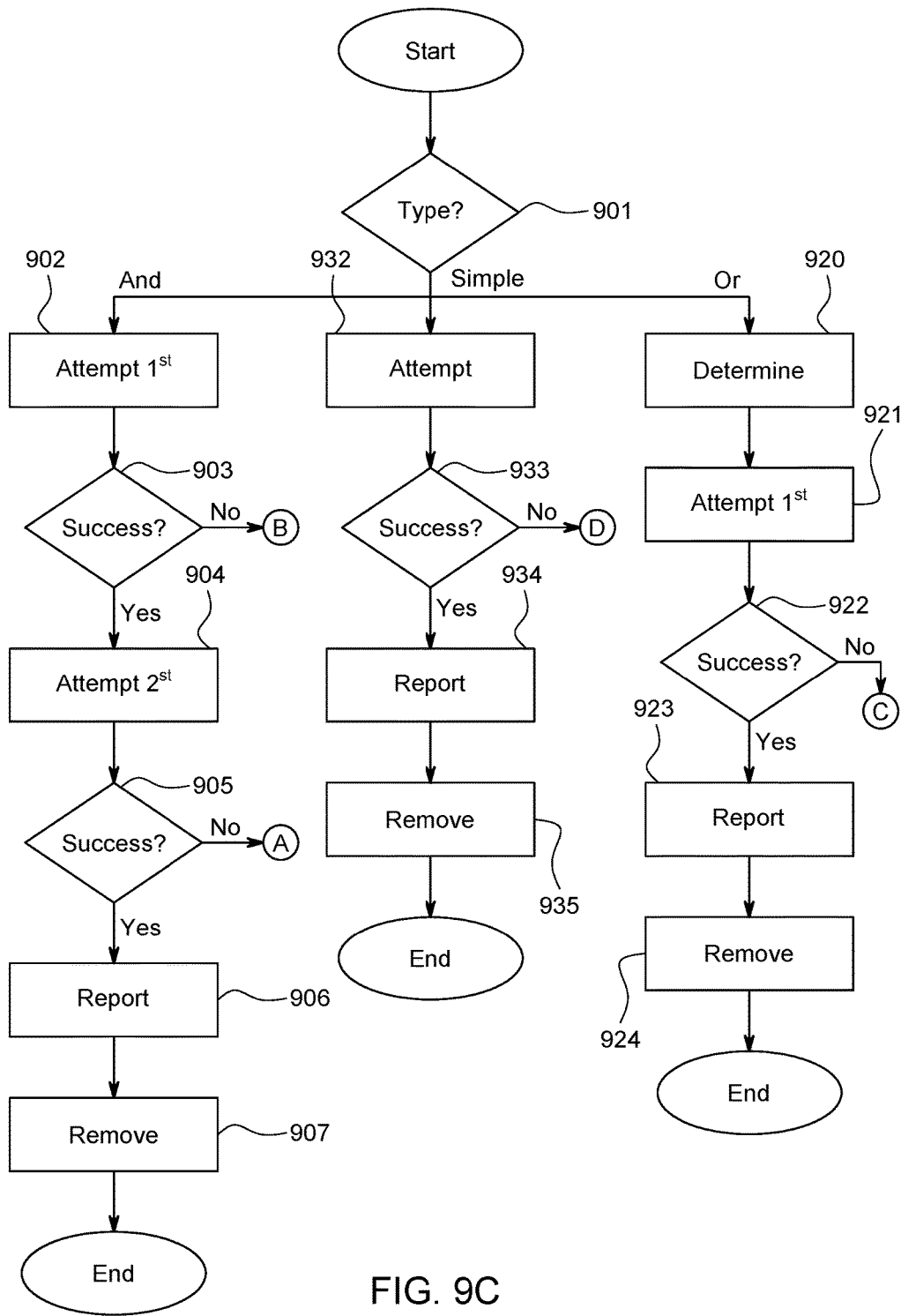
Figure 9D:
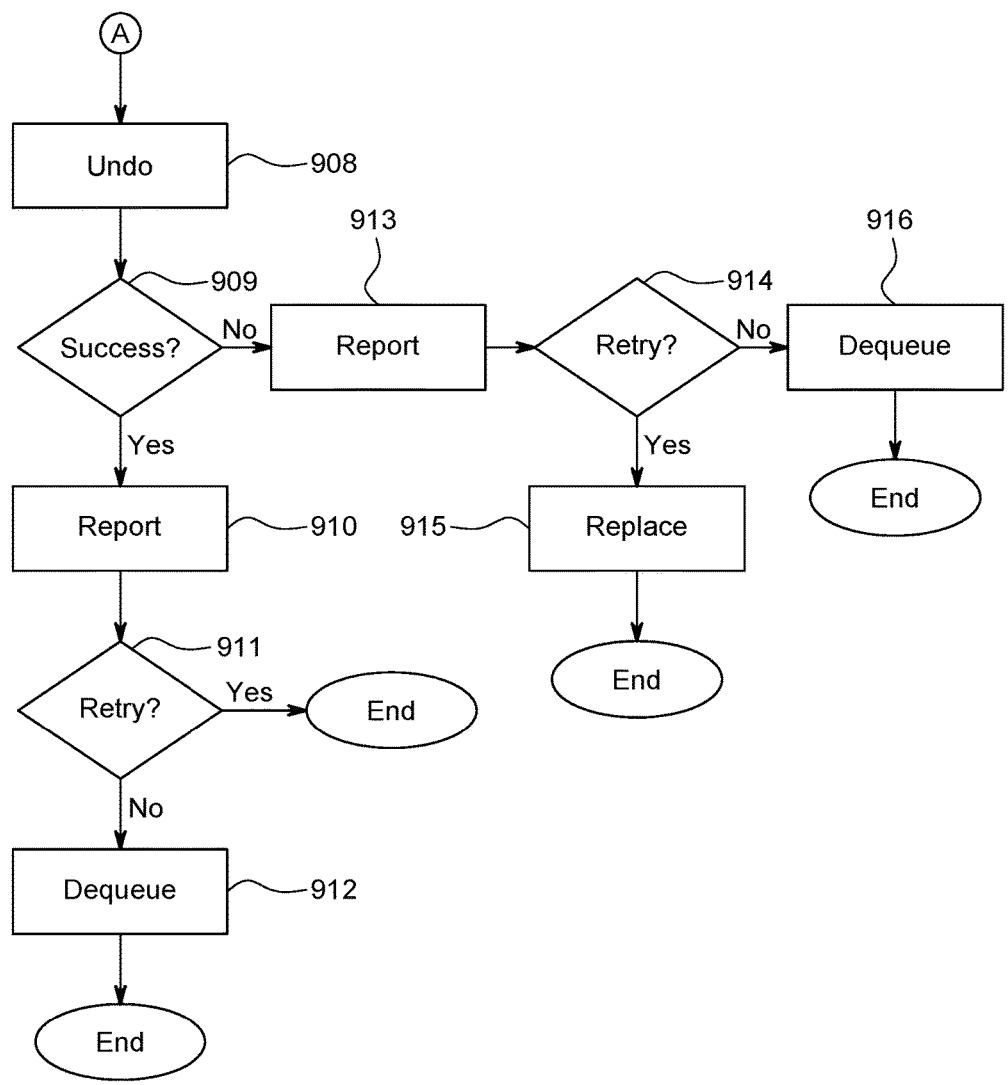
Figure 9E:
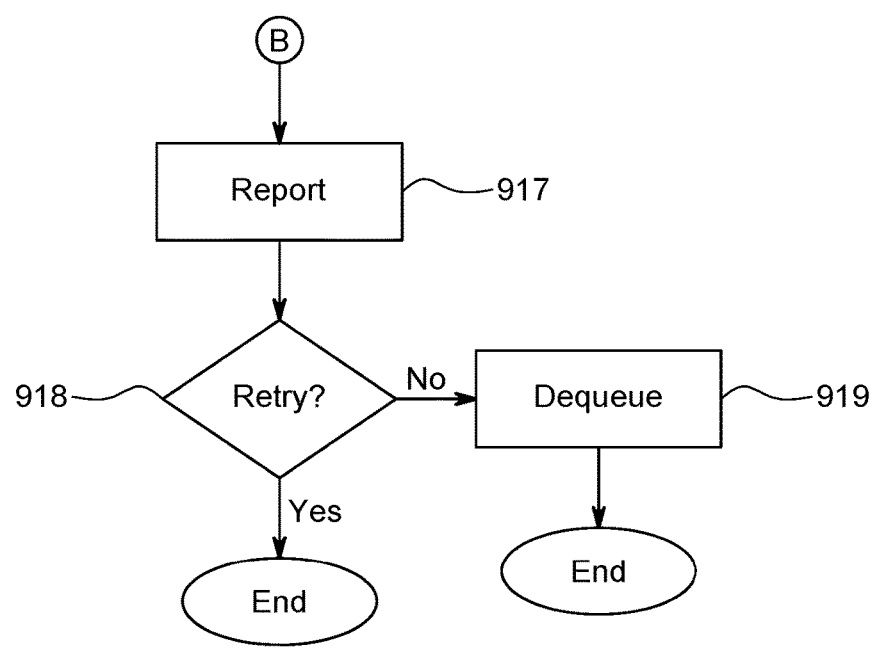
Figure 9F:
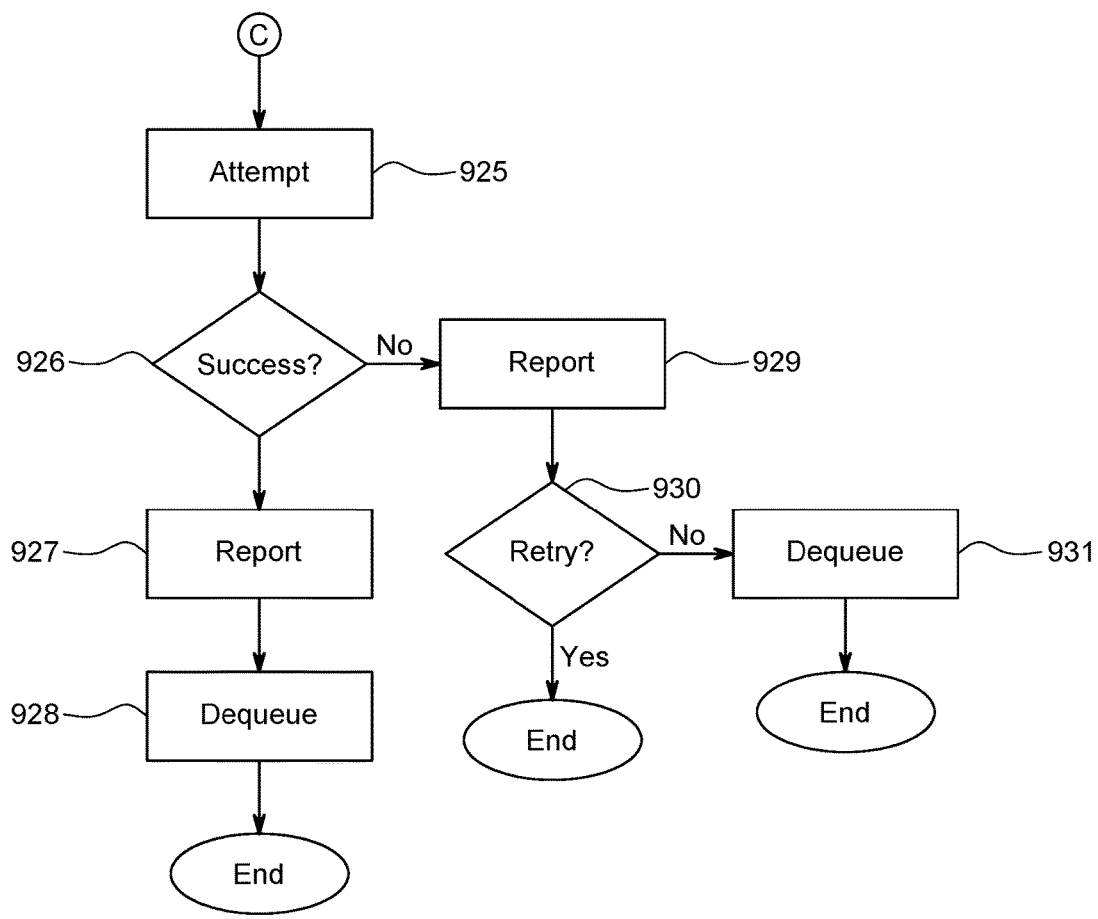
Figure 9G:
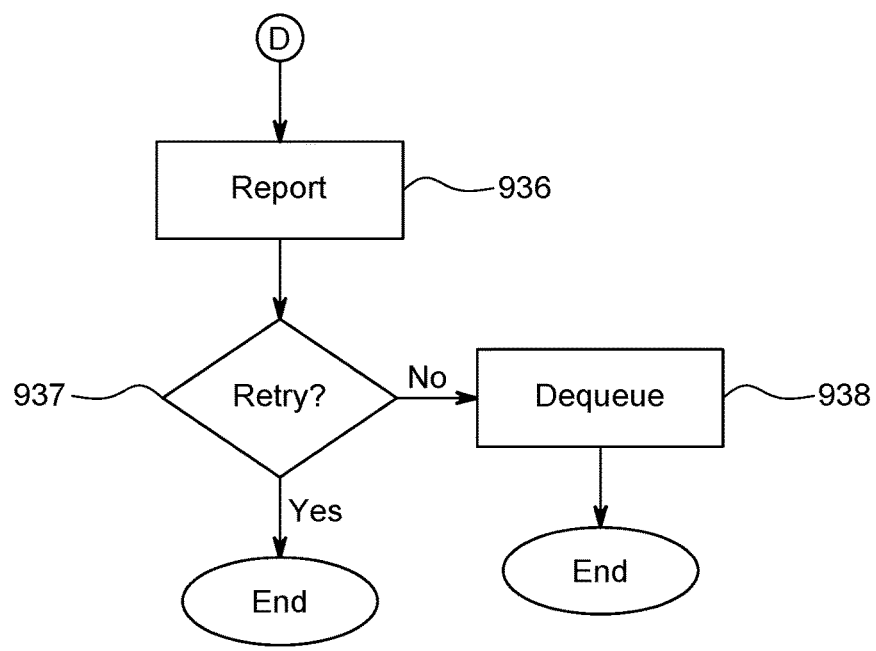

FIG. 8 is a flow chart and pseudocode of the operation of an action-capable "slow prover" component. In the process depicted, which in an optimal implementation, would start in a side-by-side processor with the fast proof, the invention starts in a state in which re-proof would not be useful [802]. The slow proof will then process, repeatedly, but only if during the proof process, the flag showing that repetition is warranted is set [801]. Each item in permanent and temporary storage for both knowledge and plans is searched, either in parallel or serially [803]. During each such iteration, the slow prover checks the known item (the item in storage) against the putative item (the item it was given). If the known item affects the putative item [804], then the putative item is simplified [805]. If the putative item is simplified to triviality [806], then the item is removed [807]. If the putative item is simplified, but not to triviality, then the flag allowing recomputation from scratch is set [808]. If the known item doesn't affect the putative item, but the known item is in temporary storage [809], then the putative item is checked to see if it can affect the known item. If so [810], the known item is simplified [811], and if now trivial [812], the known item is removed from temporary storage [813]. If a known item is reduced, but not to triviality, then the process is worth repeating [814]. The inner and outer loops repeat as needed (in this text, when no other action is specified).

FIG. 9 is a flow chart and pseudocode of execution of an item in the execution queue. In the process depicted, an item in the execution queue is ready for execution. If the item is of the AND type, such as "do this and that" [901], then the controller (which controls real or simulated physical devices) will attempt to perform the first action. In the preferred implementation, both actions can be attempted at the same time if hardware allows, but the process is being described herein in a serialized manner to make the explanation simpler [902]. If the first action was successful [903], then an attempt is made to carry out the second action [904]. Note that either or both of the actions described here may themselves be AND-Plan or OR-Plan actions, in which case recursion is used. If the second action was successful [905], then the planned goal has been accomplished, and a report of the success is made both to the user and to the knowledge base [906]. The successful plan/execution item is removed from the queue [907]. If the second action was not successful, the controller will attempt to undo the first action. Note that some actions are not at all undoable, and thus fail a priori [908]. If the controller is successful in undoing the first action [909], then a report of what happened is made to the user and into the knowledge base [910]. If the AND-Plan is not something that can be retried [911], then it is removed from the queue [912]. If it can be retried, then leaving it in the queue will force a retry later. If the undo of the first action is not successful, that circumstance, too, is reported [913]. At this point the first action is complete, and the second action is not. If the second part of the AND-Plan can be retried [914], then the AND-Plan item is replaced by the second part of the plan, so that the failed part alone may be retried later [915]. If the failed second part cannot be retried, then the entire AND-Plan is removed from the queue [916]. In the case of the first part of an AND-Plan having failed, that circumstance is reported [917]. If the overall action cannot be retried, then the AND-Plan is removed from the queue. In the case of an OR-Plan, in serialized execution, a determination of which plan item is easier is first made [920]. That easier item is attempted first [921]. In the case of parallel execution, if hardware allows, the easier item will have been accomplished first in most circumstances. If the easier item is successfully carried out [922], a report of the success is made [923], and the entire OR-Plan is removed from the queue [924], having been successfully executed, in that just one part of an OR-Plan accounts for successful execution. If the first part of an OR-Plan failed to execute, then the second part of the plan is attempted [925]. If that part is successful [926], then a report is made [927], and the entire plan is removed from the queue as a successful execution [928]. If neither part of the OR-Plan was successful, then a report of the failure is made [929]. In such a case, if the plan cannot be retried [930], it is removed from the queue [931]. In the case of a simple action planned, with neither AND nor OR, that action is attempted [932]. If successful [933], a report of the success is made [934], and the item is removed from the queue [935]. If a simple plan fails, then that failure is reported [936]. In such a case, if the plan cannot be retried [937], then it is removed from the queue [938].

Figure 10B:
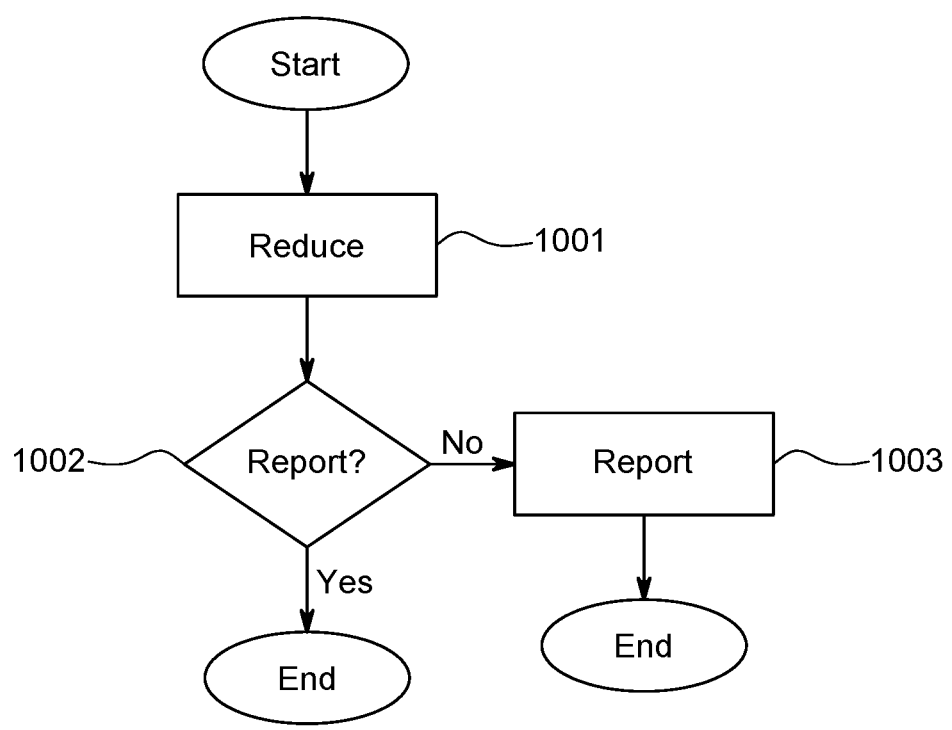

FIG. 10 is a flow chart and pseudocode of a prover reduction modified to explain actions or the lack thereof. In the process depicted, when a reduction is called for, that reduction occurs [1001]. If logic-tracing is called for [1002], then that action is added to a data structure using a key such that it can be retrieved for the user requiring the action, filtered to that user's interest. Such storage, keying, and filtering mechanisms are well known to practitioners of the art [1003].

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

Example Grammar Enhancement

The following grammar (©2012 by Linker Systems, Inc.), shown in YACC-like format is exemplary of (but not limiting to) the above, and shows only the required extensions to the grammar shown in the '022 patent:

```
%token EXPLAIN PLEASE
%token MUST_X /* must, shall */
Utterance  : EXPLAIN                       /* Turn on logic tracing */
           | EXPLAIN NOT ;                 /* Turn off logic tracing */
Svo        : PLEASE Svo ;                  /* Explicit imperative */
SSimple    : Argument MUST_X Simple ;      /* Implicit imperative */
```

Plan Logic and Logic Tracing

Logic tracing is the ability to describe why an action was or was not taken. In a prover, as first described in the '022 patent, two statements, rules, or other grammatical items can be taken in consort to prove or disprove something. In the current invention, we add other logical states, including imperatives. When a complex imperative (plan) is affected by comparison (or other operation) with another logical element, then that comparison (or other operation) may effect a change in the state of the knowledge and/or plan base. For instance, given these inputs (in any order, and shown in English, for simplicity) . . .

For all x, if x is a human, you must not hurt x.
Bill is human.
Kill is a subset of Hurt.
Kill Bill. . . .

the expanded prover would use the logic tables as shown above, in full combinatory manner (making every useful comparison [making all comparisons is usefulness is not known to the prover]), to generate this train of logic (not necessarily in this order), with these reports (or reports similar to these) . . .

"Bill", when taken in consideration with "For all x, if x is a human, you must not hurt x" yields "If Bill is a human, you must not hurt Bill". [Expansion of FOR ALL]

"Bill is human", when taken in consideration with "If Bill is human, you must not hurt Bill" yields "If True, you must not hurt Bill". [Direct comparison]

"If True, you must not hurt Bill" yields "You must not hurt Bill". [Optimization of IF]

"Kill is a subset of Hurt", when taken in consideration with "You must not hurt Bill" yields "You must not kill Bill". [SUBSET rule]

"Kill Bill", when taken in consideration with "You must not kill Bill" is contradictory, and yields "False". [Direct negative comparison]

Your request cannot be planned. [Examination]

As another example, "Kill the mouse" yields no matches, and moves directly to the execution queue. "Kill the mouse tomorrow" yields no matches either, but the time clause prevents immediate execution. That tensed imperative moves to the plan (part of the knowledge/plan base), to be re-evaluated from time to time (in the optimal instantiation, in a time-based queue), would become executable (and move to the execution queue) at midnight. Upon the death of the mouse, "I killed the mouse at 12:00:01" would be entered into the knowledge base (or perhaps "I attempted to kill the mouse at 12:00:01, but it escaped" might be entered).

The invention claimed is:

1. A method operational in a processing device, comprising:
   inputting data into a physical user interface in a language having a defined set of nonambiguous grammar rules, wherein the language includes at least one of: an artificial language or a subset of a natural language and wherein the input data is input from one or more of: a plurality of users or a plurality of sensors;
   comparing by a processing device the input data with previously stored data in a data/knowledge/plan base according to logic operations to determine the input data is an imperative, wherein the data/knowledge/plan base stores knowledge and instructions for the plurality of users or for a plurality of actuators;
   maintaining and storing by the processing device a plurality of distinct logical units for different ones of the plurality of users or for different ones of the plurality of actuators; and
   determining by the processing device to execute the imperative based on at least one of the plurality of distinct logical units;
   storing the imperative in an execution queue;
   executing the imperative; and
   reporting logic of the at least one of the plurality of distinct logical units to the user interface.

2. The method of claim 1, further comprising:
   initiating by the processing device execution of a first action in response to the imperative for a first one of the plurality of users associated with a first distinct reality and execution of a second different action in response to the imperative for a second one of the plurality of users associated with a second distinct reality.

3. The method of claim 1, further comprising:
   determining by the processing device that the imperative is a simple imperative;
   storing the simple imperative into an execution queue of a memory; and
   determining by the processing device whether the simple imperative stored in the execution queue is ready for execution.

4. The method of claim 1, wherein the defined set of nonambiguous grammar rules of the language include at least one of the following: grammar rules to form imperatives or grammar rules to form sentences, instructions or statements which imply imperatives.

5. The method of claim 1, further comprising:
   determining whether the imperative provides new information to the data/knowledge/plan base; and
   when the imperative provides new information, adding the imperative to the data/knowledge/plan base.

6. The method of claim 1, wherein executable portions of the imperative are executed.

7. The method of claim 1, wherein a record of completed executions is stored in a memory.

8. The method of claim 6, wherein a record of reasoning behind completed executions is stored in a memory.

9. The method of claim 1, wherein forms of knowledge and planning are stored in the data/knowledge base as one or more of: predications or grammar trees.

10. The method of claim 1, wherein executing the imperative based on at least one of the plurality of distinct logical units includes:
    utilizing or causing real or simulated physical action.

11. The method of claim 1, wherein generating the response in a language, time-sensitive context of knowledge and/or plans in the data/knowledge/plan base is considered in formulating the response or action.

12. The method of claim 1, further comprising:
    executing contradictory conclusions, results, and/or actions for different ones of the plurality of users in response to the imperative based on the distinct logical units for different ones of the plurality of users.

13. The method of claim 1, further comprising:
    executing contradictory actions for different ones of the plurality of actuators based on the distinct logical units for different ones of the plurality of actuators.

14. The method of claim 1, further comprising:
    concurrently storing contradictory imperatives for different ones of the plurality of users and for different ones of the plurality of actuators, based on the plurality of distinct logical units for the different ones of the plurality of users and for the different ones of the plurality of actuators.

15. The method of claim 1, comprising:
    storing general instructions for determining execution of the imperative without specific instructions on actions to be executed to perform the imperative.

16. A device for controlling actuators, comprising:
    an input interface configured to receive input data in a language characterized by having a defined set of unambiguous grammar rules;
    a processing circuit adapted to implement a parsing module adapted to parse the input data from the input module into an internal format;
    a prover module adapted to receive the parsed input data from the parse module and compare the parsed input data with stored data and/or plans in a data/knowledge/plan base to determine if the parsed input data is an imperative; and
    a memory device configured to store results of the prover module in the data/knowledge/plan base, wherein the input data is obtained from a plurality of different users and/or sensors and the data/knowledge/plan base stores plans; and
    wherein the processing circuit is configured in execution of an instruction and/or plan, to actuate one or more robotic body components or actuators.

17. The device of claim 16, wherein the device recognizes, maintains and stores distinct realities for different users and actuators.

18. The device of claim 17, wherein the device is configured to execute different actions based the distinct realities for one or more different users or actuators.

19. A method for controlling one or more actuators by a processing device, comprising:
    inputting data into the processing device in a language having a defined set of nonambiguous grammar rules, wherein the language includes at least one of: an artificial language or a subset of a natural language;
    comparing by the processing device the input data with previously stored data in a data/knowledge/plan database in a memory device;
    determining by the processing device that the input data is an imperative and determining whether the imperative includes at least one of: a simple imperative, a negative imperative or a conditional imperative;
    when a simple imperative is determined, storing the simple imperative in an execution queue in the memory device for execution by one or more of a plurality of actuators;

when a negative imperative is determined, storing the negative imperative in the data/knowledge/plan database in the memory; and when a conditional imperative is determined, storing the conditional imperative in the data/knowledge/plan database in the memory to determine whether to execute the conditional imperative, wherein the conditional imperative includes a command and a precondition.

20. The method of claim 19, wherein the precondition of the conditional imperative includes a logical state that is unknown, wherein the logical state includes at least one of: true or false.

21. The method of claim 20, further comprising:
selecting by the processing device the conditional imperative stored in the data/knowledge/plan database; and
comparing by the processing device the precondition of the conditional imperative with known items in the data/knowledge/plan database to determine the logical state of the precondition.

22. The method of claim 21, further comprising:
when the logical state of the precondition is determined as true, storing the command of the conditional imperative into the execution queue in the memory device for execution by the one or more of the plurality of actuators.

23. The method of claim 21, further comprising:
when the logical state of the precondition is determined as false, removing by the processing device the conditional imperative from storage in the data/knowledge/plan database in the memory; and
outputting a response to a physical user interface, wherein the response indicates non-execution of the conditional imperative and a reason for the non-execution.

24. The method of claim 21, further comprising:
when the logical state of the precondition remains unknown after comparing with the known items in the data/knowledge/plan database, determining by the processing device whether to perform further processing; and
when further processing is determined, setting a flag associated with the precondition to indicate further processing for the precondition.

25. The method of claim 21, wherein the comparing the precondition with known items in the data/knowledge/plan database comprises:
comparing the precondition with a first known item in the data/knowledge/plan database;
when the first known item fails to affect the precondition, determining whether the precondition affects the known item; and
simplifying the first known item when the precondition affects the first known item.

26. The method of claim 19, wherein the precondition of the conditional imperative comprises a time that has not yet occurred.

27. The method of claim 26, further comprising:
at predetermined periods of time, evaluating by the processing device the conditional imperative stored in the data/knowledge/plan database in the memory;
determining by the processing device whether the time in the precondition of the conditional imperative has occurred; and
when the time has occurred, storing by the processing device the command of the conditional imperative into an execution queue in the memory device for execution by one or more of a plurality of actuators.

28. The method of claim 19, further comprising:
maintaining and storing by the processing device a plurality of distinct realities, wherein different ones of the plurality of distinct pluralities are associated with different ones of a plurality of users; and
initiating by the processing device execution of a first action in response to the imperative for a first one of the plurality of users associated with a first distinct reality and execution of a second different action in response to the imperative for a second one of the plurality of users associated with a second distinct reality.

29. A device for controlling one or more actuators, comprising:
at least one physical interface configured to receive input data in a language having a defined set of nonambiguous grammar rules, wherein the language includes at least one of: an artificial language or a subset of a natural language;
at least one memory device that stores a data/knowledge/plan database and an execution queue;
at least one processing device operably coupled to the at least one physical interface and the at least one memory device, wherein the processing device is configured to:
compare the input data with previously stored data in the data/knowledge/plan database stored in the memory device;
determine that the input data is an imperative and determine whether the imperative includes at least one of: a simple imperative, a negative imperative or a conditional imperative;
when a simple imperative is determined, store the simple imperative in the execution queue in the memory device;
when a negative imperative is determined, store the negative imperative in the data/knowledge/plan database in the memory; and
when a conditional imperative is determined, store the conditional imperative in the data/knowledge/plan database in the memory to determine whether to execute the conditional imperative, wherein the conditional imperative includes a command and a precondition; and
at least one of a plurality of actuators configured to execute the simple imperative stored in the execution queue in the memory device.

30. The device of claim 29, wherein the precondition includes a logical state that is unknown, wherein the logical state includes at least one of: true or false.

31. The device of claim 30, wherein the processing device is further configured to:
select the conditional imperative stored in the data/knowledge/plan database; and
compare the precondition with known items in the data/knowledge/plan database to determine the logical state of the precondition.

32. The device of claim 31, wherein the processing device is further configured to:
when the logical state of the precondition is determined as true, store the command of the conditional imperative into the execution queue in the memory device for execution by the one or more of the plurality of actuators.

33. The device of claim 31, wherein the processing device is further configured to:

when the logical state of the precondition is determined as false, remove the conditional imperative from storage in the data/knowledge/plan database in the memory; and output a response to the physical interface, wherein the response indicates non-execution of the conditional imperative and a reason for the non-execution.

34. The device of claim 31, wherein the processing device is further configured to:

when a logical state of the precondition remains unknown after comparing with known items in the data/knowledge/plan database, determine whether to perform further processing; and when further processing is determined, set a flag associated with the precondition to indicate further processing for the precondition.

35. The device of claim 31, wherein the processing device is further configured to compare the precondition with known items in the data/knowledge/plan database by:

comparing the precondition with a first known item in the data/knowledge/plan database;

when the first known item fails to affect the precondition, determining whether the precondition affects the known item; and simplifying the first known item when the precondition affects the first known item.

36. The device of claim 29, wherein the precondition of the conditional imperative comprises a time that has not yet occurred.

37. The device of claim 36, wherein the processing device is further configured to:

evaluate the conditional imperative stored in the data/knowledge/plan database in the memory at predetermined periods of time;

determine whether the time in the precondition has occurred; and when the time has occurred, store the command of the conditional imperative into an execution queue in the memory device for execution by one or more of a plurality of actuators.

38. The device of claim 29, wherein the processing device is further configured to:

maintain and store a plurality of distinct realities, wherein different ones of the plurality of distinct pluralities are associated with different ones of a plurality of users.

39. The device of claim 38, wherein the processing device is further configured to:

initiate execution of a first action in response to the imperative for a first one of the plurality of users associated with a first distinct reality; and initiate execution of a second different action in response to the imperative for a second one of the plurality of users associated with a second distinct reality.

* * * * *